United States Patent
Wang (10) Patent No.: US 9,907,102 B2
(45) Date of Patent: Feb. 27, 2018

(54) METHOD FOR TRANSMITTING INFORMATION, BASE STATION, AND USER EQUIPMENT

(71) Applicant: Huawei Technologies Co., Ltd., Shenzhen (CN)

(72) Inventor: Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 14/794,333

(22) Filed: Jul. 8, 2015

(65) Prior Publication Data
US 2015/0341975 A1 Nov. 26, 2015

Related U.S. Application Data

(63) Continuation of application No. PCT/CN2014/078311, filed on May 23, 2014.

(51) Int. Cl.
*H04W 28/04* (2009.01)
*H04W 72/04* (2009.01)
(Continued)

(52) U.S. Cl.
CPC ............ *H04W 76/023* (2013.01); *H04L 1/00* (2013.01); *H04W 28/044* (2013.01);
(Continued)

(58) Field of Classification Search
CPC . H04W 76/023; H04W 72/04; H04W 74/002; H04W 28/044
See application file for complete search history.

(56) References Cited

U.S. PATENT DOCUMENTS 8,462,688 B1 * 6/2013 Dinan ................. H04W 74/006
370/312
8,743,748 B2 * 6/2014 Pan .................... H04W 56/0045
370/280
(Continued)

FOREIGN PATENT DOCUMENTS

| CN | 1768547 A | 5/2006 |
| CN | 101154984 A | 4/2008 |

(Continued)

OTHER PUBLICATIONS

Foreign Communication From a Counterpart Application, European Application No. 14870653.4, Extended European Search Report dated Dec. 21, 2015, 7 pages.
(Continued)

*Primary Examiner* — Rasheed Gidado
(74) *Attorney, Agent, or Firm* — Conley Rose, P.C.

(57) ABSTRACT

A method for transmitting information, a base station, and a user equipment, where the method includes determining, by a user equipment, a timing advance T of a signal before sending the signal; determining, by the user equipment, an indication N of a timing adjustment according to at least the T; and sending, by the user equipment, scheduling assignment signaling that carries the N. By using allocation of non-identical time-frequency resources to different user clusters, the scheduling assignment signaling that carries the timing advance sent by the user equipment can bear more useful information, thereby avoiding unnecessary waste.

12 Claims, 4 Drawing Sheets

(51) Int. Cl.
  *H04W 76/02* (2009.01)
  *H04W 74/00* (2009.01)
  *H04L 1/00* (2006.01)
  *H04W 56/00* (2009.01)
  *H04W 72/12* (2009.01)

(52) U.S. Cl.
  CPC ....... *H04W 56/001* (2013.01); *H04W 56/004* (2013.01); *H04W 72/04* (2013.01); *H04W 74/002* (2013.01); *H04W 72/1284* (2013.01)

(56) References Cited

U.S. PATENT DOCUMENTS

| | | | | |
|---|---|---|---|---|
| 8,837,614 | B2* | 9/2014 | Li | H04L 25/022 375/260 |
| 9,398,465 | B2* | 7/2016 | Chou | H04W 16/18 |
| 9,578,616 | B2* | 2/2017 | Etemad | H04W 52/34 |
| 2001/0036168 | A1* | 11/2001 | Terry | H04B 7/2681 370/337 |
| 2012/0120821 | A1* | 5/2012 | Kazmi | H04W 56/0005 370/252 |
| 2012/0258706 | A1* | 10/2012 | Yu | H04W 56/0045 455/426.1 |
| 2013/0010781 | A1* | 1/2013 | Gresset | H04J 3/0652 370/350 |
| 2013/0121315 | A1* | 5/2013 | Langereis | H04W 56/0045 370/336 |
| 2014/0050153 | A1* | 2/2014 | Iwamura | H04W 56/00 370/328 |
| 2014/0098784 | A1 | 4/2014 | Iwamura et al. | |
| 2014/0226640 | A1* | 8/2014 | Zhu | H04W 56/0045 370/336 |
| 2014/0355539 | A1* | 12/2014 | Yang | H04W 74/008 370/329 |
| 2015/0085839 | A1* | 3/2015 | Bergstrom | H04W 56/0045 370/336 |

FOREIGN PATENT DOCUMENTS

| | | |
|---|---|---|
| CN | 101166057 A | 4/2008 |
| CN | 101296024 A | 10/2008 |
| CN | 101478780 A | 7/2009 |
| CN | 102647783 A | 8/2012 |
| CN | 103108389 A | 5/2013 |
| EP | 2544387 A1 | 1/2013 |
| JP | 2012244422 A | 12/2012 |
| WO | 2010108549 A1 | 9/2010 |
| WO | 2013095004 A1 | 6/2013 |

OTHER PUBLICATIONS

Partial English Translation and Abstract of Japanese Patent Application No. 2012-244422, Dec. 10, 2012, 30 pages.
Foreign Communication From a Counterpart Application, Japanese Application No. 2016-520253, Japanese Office Action dated Aug. 30, 2016, 6 pages.
Foreign Communication From a Counterpart Application, Japanese Application No. 2016-520253, English Translation of Japanese Office Action dated Aug. 30, 2016, 7 pages.
Partial English Translation and Abstract of Chinese Patent Application No. CN102647783, Aug. 22, 2012, 37 pages.
Foreign Communication From a Counterpart Application, Chinese Application No. 201480001386.6, Chinese Office Action dated Jan. 3, 2017, 9 pages.
Foreign Communication From a Counterpart Application, Chinese Application No. 201480001386.6, Chinese Search Report dated Dec. 13, 2016, 2 pages.
Partial English Translation and Abstract of Chinese Patent Application No. CN101154984A, Jun. 19, 2015, 4 pages.
Partial English Translation and Abstract of Chinese Patent Application No. CN101478780A, Jun. 19, 2015, 2 pages.
Partial English Translation and Abstract of Chinese Patent Application No. CN103108389A, Jun. 19, 2015, 3 pages.
Foreign Communication From a Counterpart Application, PCT Application No. PCT/CN2014/078311, International Search Report dated Feb. 11, 2015, 7 pages.
Foreign Communication From a Counterpart Application, PCT Application No. PCT/CN2014/078311, Written Opinion dated Feb. 11, 2015, 5 pages.
Foreign Communication From a Counterpart Application, Korean Application No. 10-2015-7018664, Korean Office Action dated Apr. 28, 2016, 3 pages.
Foreign Communication From a Counterpart Application, Korean Application No. 10-2015-7018664, English Translation of Korean Office Action dated Apr. 28, 2016, 2 pages.
Foreign Communication From a Counterpart Application, Korean Application No. 10-2015-7018664, English Translation of Notice of Allowance dated Feb. 28, 2017, 3 pages.

* cited by examiner

METHOD FOR TRANSMITTING INFORMATION, BASE STATION, AND USER EQUIPMENT

CROSS-REFERENCE TO RELATED APPLICATIONS

This application is a continuation of International Application No. PCT/CN2014/078311, filed on May 23, 2014, which is incorporated herein by reference in its entirety.

TECHNICAL FIELD

Embodiments of the present invention relate to the communications field, and more specifically, to a method for transmitting information, a base station, and a user equipment.

BACKGROUND

A device to device proximity service (D2D ProSe) between user equipment (UE) has become a hot topic for a Long Term Evolution (LTE) system.

Currently, in the D2D ProSe, to ensure that a receive end can correctly receive a signal sent by a transmit end, a timing advance needs to be provided when the transmit end sends the signal. An existing timing advance is usually an integral multiple (for example, 1, 2 or N, and N is a positive integer that is not less than 2) of a length of an extended cyclic prefix. Assuming that a used timing advance is a length of one extended cyclic prefix (for example, 6 bits), these 6 bits are all zeros, which may cause unnecessary waste.

SUMMARY

Embodiments of the present invention provide a method for transmitting information, a base station, and a user equipment, which can provide an appropriate length of a timing advance so that scheduling assignment (SA) signaling that carries the timing advance sent by the user equipment bears more useful information, thereby avoiding unnecessary waste.

According to a first aspect, a method for transmitting information is provided, where the method includes determining, by a base station, an indication of a timing adjustment, and transmitting, by the base station, the indication to a user equipment.

With reference to the first aspect, in a first possible implementation manner of the first aspect, transmitting, by the base station, the indication to a user equipment includes transmitting, by the base station, the indication using system information block signaling.

According to a second aspect, a method for transmitting information is provided, where the method includes determining, by a user equipment, a timing advance T of a signal before sending the signal; determining, by the user equipment, an indication N of a timing adjustment according to at least the T; and sending, by the user equipment, scheduling assignment signaling that carries the N.

With reference to the second aspect, in a first possible implementation manner of the second aspect, determining, by the user equipment, an indication N of a timing adjustment according to at least the T includes determining, by the user equipment, the N according to the T and N=f (T/D), where f ( ) represents rounding up or rounding down, and a value of D is any one of: 1 Ts, 2 Ts, 4 Ts, 8 Ts, 16 Ts, 24 Ts or 32 Ts, where 1 Ts=1 ms/30720, and ms represents millisecond.

With reference to the second aspect or the first possible implementation manner of the second aspect, in a second possible implementation manner of the second aspect, the method further includes sending, by the user equipment, the signal.

With reference to the second aspect or the first possible implementation manner of the second aspect or the second possible implementation manner of the second aspect, in a third possible implementation manner of the second aspect, determining, by a user equipment, a timing advance T of a signal before sending the signal includes determining, by the user equipment, the T according to timing adjustment signaling sent by a base station.

According to a third aspect, a method for transmitting information is provided, where the method includes determining, by a user equipment, a timing adjustment of a signal; adjusting, by the user equipment, a time window according to the timing adjustment; and receiving, by the user equipment, the signal using an adjusted time window.

With reference to the third aspect, in a first possible implementation manner of the third aspect, determining, by a user equipment, a timing adjustment of a signal includes determining, by the user equipment, an indication N of the timing adjustment; and determining, by the user equipment, the timing adjustment according to at least the N.

With reference to the third aspect or the first possible implementation manner of the third aspect, in a second possible implementation manner of the third aspect, determining, by the user equipment, the timing adjustment according to at least the N includes determining, by the user equipment, the timing adjustment according to the N and T=N*D, where a value of D is any one of: 1 Ts, 2 Ts, 4 Ts, 8 Ts, 16 Ts, 24 Ts or 32 Ts; and 1 Ts=1 ms/30720 and ms represents millisecond.

With reference to the third aspect or the first possible implementation manner of the third aspect or the second possible implementation manner of the third aspect, in a third possible implementation manner of the third aspect, determining, by the user equipment, an indication N of the timing adjustment includes acquiring, by the user equipment, the indication N of the timing adjustment using received scheduling assignment signaling.

With reference to the third aspect or the first possible implementation manner of the third aspect or the second possible implementation manner of the third aspect or the third possible implementation manner of the third aspect, in a fourth possible implementation manner of the third aspect, determining, by the user equipment, an indication N of the timing adjustment includes acquiring, by the user equipment, an indication M of the timing adjustment using system information block signaling sent by a base station; and determining that the indication M of the timing adjustment is the indication N of the timing adjustment.

With reference to the third aspect and any possible implementation manner of the first to fourth possible implementation manners of the third aspect, determining, by a user equipment, a timing adjustment of a signal includes acquiring, by the user equipment, the indication N of the timing adjustment using the received scheduling assignment signaling, and determining, by the user equipment, a first timing adjustment $T_1$ according to the N and $T_1=N*D$, where the value of D is any one of: 1 Ts, 2 Ts, 4 Ts, 8 Ts, 16 Ts, 24 Ts or 32 Ts; and 1 Ts=1 ms/30720 and ms represents millisecond; acquiring, by the user equipment, the indication M of the timing adjustment using the system information block signaling sent by the base station, and determining, by the user equipment, a second timing adjustment $T_2$ according to the M and $T_2=M*D$, where the value of D is any one of: 1 Ts, 2 Ts, 4 Ts, 8 Ts, 16 Ts, 24 Ts or 32 Ts; and 1 Ts=1 ms/30720 and ms represents millisecond; determining that $T_2$ is the timing adjustment of the signal if $(T_2-T_1) \leq T\_cp*Alpha$, where T_cp is a length of a system cyclic prefix and a value of Alpha is 0.2, 0.4, 0.6, 0.8 or 1; and determining that $T_1$ is the timing adjustment of the signal if $(T_2-T_1) > T\_cp*Alpha$, where T_cp is a length of a system cyclic prefix and a value of Alpha is 0.2, 0.4, 0.6, 0.8 or 1.

According to a fourth aspect, a base station is provided, where the base station includes a determining module configured to determine an indication of a timing adjustment; and a transmission module configured to transmit the indication to a user equipment.

With reference to the fourth aspect, in a first possible implementation manner of the fourth aspect, the transmission module transmits the indication using system information block signaling.

According to a fifth aspect, a user equipment is provided, where the user equipment includes a first determining module configured to determine a timing advance T of a signal before the user equipment sends the signal; a second determining module configured to determine an indication N of a timing adjustment according to at least the T; and a sending module configured to send scheduling assignment signaling that carries the N.

With reference to the fifth aspect, in a first possible implementation manner of the fifth aspect, the second determining module is configured to determine the N according to the T and N=f (T/D), where f ( ) represents rounding up or rounding down, and a value of D is any one of: 1 Ts, 2 Ts, 4 Ts, 8 Ts, 16 Ts, 24 Ts or 32 Ts, where 1 Ts=1 ms/30720, and ms represents millisecond.

With reference to the fifth aspect or the first possible implementation manner of the fifth aspect, in a second possible implementation manner of the fifth aspect, the sending module is further configured to send the signal.

With reference to the fifth aspect and either possible implementation manner of the first and second possible implementation manners of the fifth aspect, in a third possible implementation manner of the fifth aspect, the first determining module is configured to determine the T according to the timing adjustment signaling sent by a base station.

According to a sixth aspect, a user equipment is provided, where the user equipment includes a determining module configured to determine a timing adjustment of a signal; an adjusting module configured to adjust a time window according to the timing adjustment determined by the determining module; and a receiving module configured to receive the signal using a time window adjusted by the adjusting module.

With reference to the sixth aspect, in a first possible implementation manner of the sixth aspect, the timing adjustment is determined, after an indication N of the timing adjustment is determined, by the determining module according to at least the N.

With reference to the sixth aspect or the first possible implementation manner of the sixth aspect, in a second possible implementation manner of the sixth aspect, the indication N of the timing adjustment is acquired by the determining module using received scheduling assignment signaling.

With reference to the sixth aspect or the first possible implementation manner of the sixth aspect or the second possible implementation manner of the sixth aspect, in a third possible implementation of the sixth aspect, the indication N of the timing adjustment is obtained after the determining module acquires an indication M of the timing adjustment using system information block signaling sent by a base station and determines that the indication M of the timing adjustment is the indication N of the timing adjustment.

With reference to the sixth aspect or any possible implementation manner of the first to third possible implementation manners of the sixth aspect, in a fourth possible implementation manner of the sixth aspect, the determining module includes a first determining unit configured to acquire the indication N of the timing adjustment using the received scheduling assignment signaling, and configured to determine a first timing adjustment $T_1$ according to the N and $T_1=N*D$, where a value of D is any one of: 1 Ts, 2 Ts, 4 Ts, 8 Ts, 16 Ts, 24 Ts or 32 Ts; and 1 Ts=1 ms/30720 and ms represents millisecond; a second determining unit configured to acquire the indication M of the timing adjustment using the system information block signaling sent by the base station, and determine a second timing adjustment $T_2$ according to the M and $T_2=M\times D$, where the value of D is any one of: 1 Ts, 2 Ts, 4 Ts, 8 Ts, 16 Ts, 24 Ts or 32 Ts; and 1 Ts=1 ms/30720 and ms represents millisecond; and a third determining unit configured to determine that $T_2$ is the timing adjustment of the signal if $(T_2-T_1) \leq T\_cp*Alpha$, where T_cp is a length of a system cyclic prefix and a value of Alpha is 0.2, 0.4, 0.6, 0.8 or 1; and configured to determine that $T_1$ is the timing adjustment of the signal if $(T_2-T_1) > T\_cp*Alpha$, where T_cp is a length of a system cyclic prefix and a value of Alpha is 0.2, 0.4, 0.6, 0.8 or 1.

In conclusion, according to the method for transmitting information, the base station, and the user equipment in the embodiments of the present invention, scheduling assignment signaling that carries a timing advance sent by the user equipment can bear more useful information, thereby avoiding unnecessary waste.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Long Term Evolution Advanced (LTE-Advanced) system, and a Universal Mobile Telecommunications System (UMTS).

It should be understood that in the embodiments of the present invention, a user equipment (UE) includes but is not limited to a mobile station (MS), a mobile terminal, a mobile telephone, a handset, a portable equipment, and the like. The user equipment may communicate with one or more core networks using a radio access network (RAN). For example, the user equipment may be a mobile telephone (also referred to as "cellular" phone) or a computer having a wireless communication function. The user equipment may also be a portable, pocket-sized, handheld, computer built-in, or in-vehicle mobile apparatus.

In the embodiments of the present invention, a base station may be a base transceiver station (BTS) in a GSM or CDMA, may be an NodeB in WCDMA, or may be an evolved NodeB (eNB or e-NodeB) in LTE, which is not limited in the embodiments of the present invention.

It should be understood that the user equipment in the technical solutions of the present invention has a D2D communication function. That is, two user equipment can perform D2D communication with each other.

Figure 1:
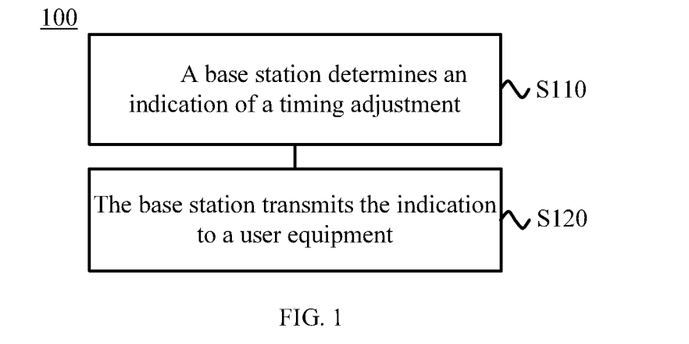
FIG. 1 shows a schematic diagram of a method for transmitting information according to an embodiment of the present invention.

FIG. 1 shows a method 100 for transmitting information, where the method 100 may be executed, for example, by a base station. As shown in FIG. 1, the method 100 includes the following steps.

S110. The base station determines an indication of a timing adjustment (TA).

S120. The base station transmits the indication to a user equipment.

Transmitting, by the base station, the indication to a user equipment includes transmitting, by the base station, the indication using system information block (SIB) signaling.

It should be noted that M may be used to represent the indication of the timing adjustment, which merely facilitates description herein and does not constitute a limit.

Therefore, according to the method for transmitting information provided in this embodiment of the present invention, scheduling assignment signaling that carries a timing advance sent by a user equipment can bear more useful information, thereby avoiding unnecessary waste.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 2:
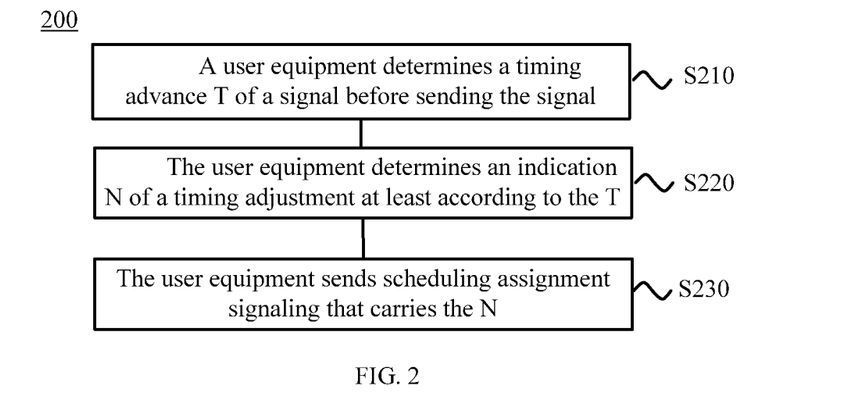
FIG. 2 shows a schematic diagram of another method for transmitting information according to an embodiment of the present invention.
Figure 3:
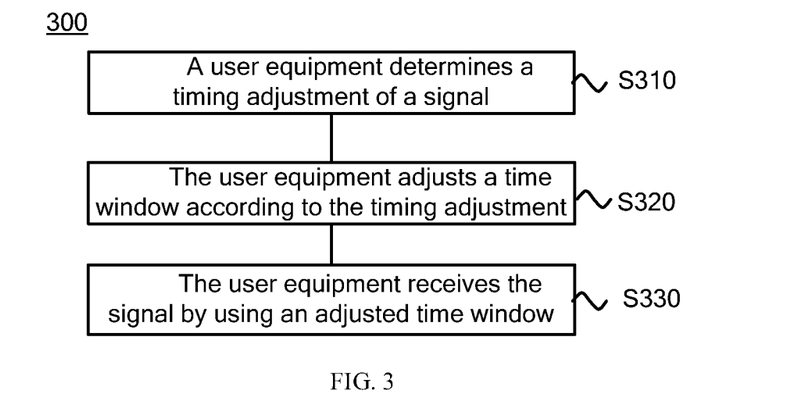
FIG. 3 shows a schematic diagram of another method for transmitting information according to an embodiment of the present invention.

With reference to FIG. 1, the method for transmitting information according to this embodiment of the present invention is described above in detail from the perspective of the base station. With reference to FIG. 2 and FIG. 3, a method for transmitting information according to an embodiment of the present invention is described below from the perspective of a user equipment. In FIG. 2, the user equipment is described as a transmit end, and in FIG. 3, the user equipment is described as a receive end. It should be noted that the user equipment may be either a transmit end or a receive end.

As shown in FIG. 2, according to a method 200 for transmitting information provided in an embodiment of the present invention, the method 200 includes the following steps.

S210. The user equipment determines a timing advance T of a signal before sending the signal.

S220. The user equipment determines an indication N of a timing adjustment according to at least the T.

S230. The user equipment sends scheduling assignment signaling that carries the N.

It should be noted that T may be used to represent the timing adjustment herein, and N may be used to represent the indication of the timing adjustment, which merely facilitates description herein and does not constitute a limit.

Optionally, determining, by the user equipment, an indication N of a timing adjustment according to at least the T includes determining, by the user equipment, the N according to the T and N=f (T/D), where f ( ) represents rounding up or rounding down, and a value of D is any one of: 1 Ts, 2 Ts, 4 Ts, 8 Ts, 16 Ts, 24 Ts or 32 Ts, where 1 Ts=1 ms/30720, and ms represents millisecond. In addition, T/D represents a value obtained after T is divided by D.

Optionally, after S230, the method further includes the following step.

The user equipment sends the signal.

Optionally, determining, by the user equipment, a timing advance T of a signal before sending the signal includes determining, by the user equipment, the T according to timing adjustment signaling sent by a base station.

It should be noted that the foregoing signal includes but is not limited to a signal involved in D2D communication, for example, a discovery signal.

Therefore, according to the method for transmitting information provided in this embodiment of the present invention, scheduling assignment signaling that carries a timing advance sent by a user equipment can bear more useful information, thereby avoiding unnecessary waste.

As shown in FIG. 3, according to a method 300 for transmitting information provided in an embodiment of the present invention, the method 300 includes the following steps.

S310. A user equipment determines a timing adjustment of a signal.

S320. The user equipment adjusts a time window according to the timing adjustment.

S330. The user equipment receives the signal using an adjusted time window.

Optionally, determining, by the user equipment, a timing adjustment of a signal includes determining, by the user equipment, an indication N of the timing adjustment; and determining, by the user equipment, the timing adjustment according to at least the N.

Optionally, determining, by the user equipment, the timing adjustment according to at least the N includes determining, by the user equipment, the timing adjustment according to the N and T=N*D, where a value of D is any one of: 1 Ts, 2 Ts, 4 Ts, 8 Ts, 16 Ts, 24 Ts or 32 Ts; and 1 Ts=1 ms/30720 and ms represents millisecond. Herein, N*D indicates that N is multiplied by D.

Optionally, determining, by the user equipment, an indication N of the timing adjustment includes acquiring, by the user equipment, the indication N of the timing adjustment using received scheduling assignment signaling. Herein, the scheduling assignment signaling received by the user equipment may be sent by another user equipment with which the user equipment performs D2D communication.

Optionally, determining, by the user equipment, an indication N of the timing adjustment includes acquiring, by the user equipment, an indication M of the timing adjustment using SIB signaling sent by a base station; and determining that the indication M of the timing adjustment is the indication N of the timing adjustment.

Optionally, determining, by a user equipment, a timing adjustment of a signal includes acquiring, by the user equipment, the indication N of the timing adjustment using received scheduling assignment signaling, and determining, by the user equipment, a first timing adjustment $T_1$ according to the N and $T_1=N*D$, where the value of D is any one of: 1 Ts, 2 Ts, 4 Ts, 8 Ts, 16 Ts, 24 Ts or 32 Ts; 1 Ts=1 ms/30720 and ms represents millisecond; and herein, N*D indicates that N is multiplied by D; acquiring, by the user equipment, the indication M of the timing adjustment using the SIB signaling sent by the base station, and determining, by the user equipment, a second timing adjustment $T_2$ according to the M and $T_2=M*D$, where the value of D is any one of: 1 Ts, 2 Ts, 4 Ts, 8 Ts, 16 Ts, 24 Ts or 32 Ts; and 1 Ts=1 ms/30720 and ms represents millisecond; determining that $T_2$ is the timing adjustment of the signal if $(T_2-T_1) \leq T\_cp*Alpha$, where T_cp is a length of a system cyclic prefix and a value of Alpha is 0.2, 0.4, 0.6, 0.8 or 1; and determining that $T_1$ is the timing adjustment of the signal if $(T_2-T_1)>T\_cp*Alpha$, where T_cp is a length of a system cyclic prefix and a value of Alpha is 0.2, 0.4, 0.6, 0.8 or 1.

It should be noted that one timing adjustment may be applicable to one or more signals, which is not limited herein.

It should be noted that T may be used to represent the timing adjustment herein, and N may be used to represent the indication of the timing adjustment, which merely facilitates description herein and does not constitute a limit.

Therefore, according to the method for transmitting information provided in this embodiment of the present invention, scheduling assignment signaling that carries a timing advance sent by a user equipment can bear more useful information, thereby avoiding unnecessary waste.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

With reference to FIG. 1 to FIG. 3, the method for transmitting information according to the embodiments of the present invention is described above in detail, and with reference to FIG. 4 to FIG. 9, a base station and a user equipment according to an embodiment of the present invention are described below in detail.

Figure 4:
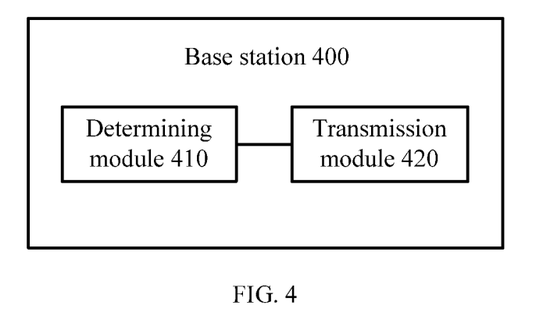
FIG. 4 shows a schematic block diagram of a base station according to an embodiment of the present invention.

FIG. 4 shows a schematic block diagram of a base station 400 according to an embodiment of the present invention. As shown in FIG. 4, the base station 400 includes a determining module 410 configured to determine an indication of a timing adjustment; and a transmission module 420 configured to transmit the indication to a user equipment.

Optionally, the transmission module 420 transmits the indication using SIB signaling.

Figure 7:
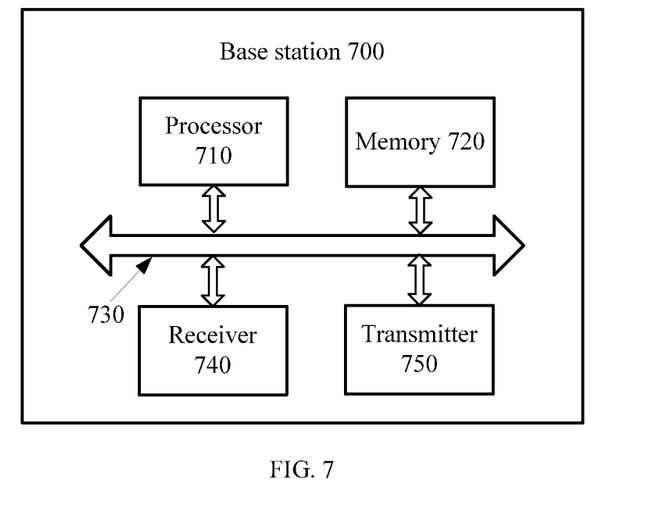
FIG. 7 shows a schematic block diagram of a base station according to an embodiment of the present invention.

From the perspective of another implementation manner, as shown in FIG. 7, an embodiment of the present invention further provides a base station. The base station 700 includes a processor 710, a memory 720, a bus system 730, a receiver 740 and a transmitter 750. The processor 710, the memory 720, the receiver 740 and the transmitter 750 are connected by the bus system 730. The memory 720 is configured to store an instruction, and the processor 710 is configured to execute the instruction stored in the memory 720 so as to control the receiver 740 to receive a signal, an instruction, or a message and control the transmitter 750 to send a signal, signaling, or a message. The processor 710 is configured to determine an indication of a timing adjustment, and the transmitter 750 is configured to transmit the indication determined by the processor 710 to a user equipment.

Optionally, the transmitter 750 transmits the indication using SIB signaling.

It should be understood that, in this embodiment of the present invention, the processor 710 may be a central processing unit (CPU), or the processor 710 may be another general purpose processor, a digital signal processor (DSP), an application-specific integrated circuit (ASIC), a field programmable gate array (FPGA) or another programmable logical device, a discrete gate or transistor logic device, a discrete hardware assembly, or the like. The general purpose processor may be a microprocessor, or the processor may be any conventional processor or the like.

The memory 720 may include a read-only memory (ROM) and a random access memory (RAM), and provides an instruction and data to the processor 710. A part of the memory 720 may further include a nonvolatile RAM. For example, the memory 720 may further store information about a device type.

The bus system 730 may further include a power bus, a control bus, a status signal bus, and the like, in addition to a data bus. However, for clarity of description, various buses are marked as the bus system 730 in the figure.

In an implementation process, the steps in the foregoing methods may be completed using an integrated logic circuit of hardware in the processor 710 or an instruction in a form of software. Steps of the methods disclosed with reference to the embodiments of the present invention may be directly executed and accomplished by means of a hardware processor or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 720. The processor 710 reads information from the memory 720 and completes the steps of the foregoing methods in combination with the hardware of the processor 710. To avoid repetition, details are not described herein again.

It should be understood that the base station 400 and the base station 700 according to the embodiments of the present invention may correspond to the base station in the methods for transmitting information in the embodiments of the present invention and that the foregoing and other operations and/or functions of modules in the base station 400 each are used to implement corresponding procedures of the methods in FIG. 1 to FIG. 3, and for brevity, details are not described herein again.

In addition, a computer readable medium is further provided including a computer readable instruction that executes the operations from S110 to S120 in the method of the foregoing embodiments.

In addition, a computer program product is further provided, including the foregoing computer readable medium.

Therefore, according to the base station provided in the embodiments of the present invention, scheduling assignment signaling that carries a timing advance sent by a user equipment can bear more useful information, thereby avoiding unnecessary waste.

With reference to FIG. 4 and FIG. 7, the base station according to the embodiments of the present invention is described above in detail, and with reference to FIG. 5 and FIG. 8, and FIG. 6 and FIG. 9, a user equipment according to an embodiment of the present invention is described in detail.

Figure 5:
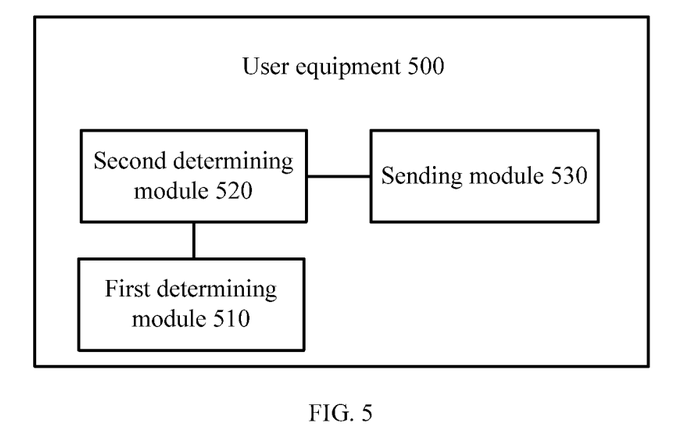
FIG. 5 shows a schematic block diagram of a user equipment according to an embodiment of the present invention.

FIG. 5 shows a schematic block diagram of a user equipment 500 according to an embodiment of the present invention. As shown in FIG. 5, the user equipment 500 includes a first determining module 510 configured to determine a timing advance T of a signal before the user equipment sends the signal; a second determining module 520 configured to determine an indication N of a timing adjustment according to at least the T; and a sending module 530 configured to send scheduling assignment signaling that carries the N.

Optionally, the second determining module 520 is configured to determine the N according to the T and N=f (T/D), where f ( ) represents rounding up or rounding down, and a value of D is any one of: 1 Ts, 2 Ts, 4 Ts, 8 Ts, 16 Ts, 24 Ts or 32 Ts, where 1 Ts=1 ms/30720, and ms represents millisecond. Herein, T/D represents T divided by D.

Optionally, the sending module 530 is further configured to send the signal.

Optionally, the first determining module 510 is configured to determine the T according to timing adjustment signaling sent by a base station.

Figure 8:
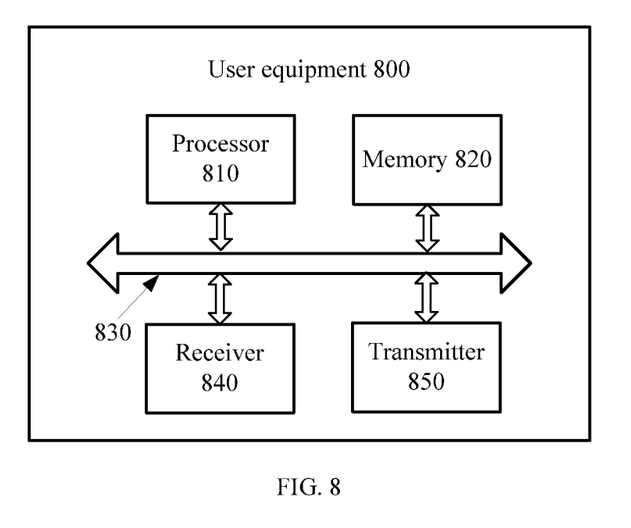
FIG. 8 shows a schematic block diagram of a user equipment according to an embodiment of the present invention.

As shown in FIG. 8, an embodiment of the present invention further provides a user equipment 800, where the user equipment 800 includes a processor 810, a memory 820, a bus system 830, a receiver 840 and a transmitter 850. The processor 810, the memory 820, the receiver 840 and the transmitter 850 are connected by the bus system 830. The memory 820 is configured to store an instruction, and the processor 810 is configured to execute the instruction stored in the memory 820 so as to control the receiver 840 to receive a signal, an instruction, or a message and control the transmitter 850 to send a signal, an instruction, or a message. The processor 810 is configured to determine a timing advance T of the signal before the transmitter 850 sends the signal and determine an indication N of a timing adjustment according to at least the T, and the transmitter 850 is configured to send scheduling assignment signaling that carries the N.

Optionally, the processor 810 is configured to determine the N according to the T and N=f (T/D), where f ( ) represents rounding up or rounding down, and a value of D is any one of: 1 Ts, 2 Ts, 4 Ts, 8 Ts, 16 Ts, 24 Ts or 32 Ts, where 1 Ts=1 ms/30720, and ms represents millisecond. Herein, T/D represents T divided by D.

Optionally, the transmitter 850 is further configured to send the signal.

Optionally, the processor 810 is configured to determine the T according to timing adjustment signaling sent by a base station.

It should be understood that, in this embodiment of the present invention, the processor 810 may be a CPU, and the processor 810 may also be another general purpose processor, a DSP, an ASIC, an FPGA or another programmable logical device, a discrete gate or transistor logic device, a discrete hardware assembly, or the like. The general purpose processor may be a microprocessor, or the processor may be any conventional processor or the like.

The memory 820 may include a ROM and a RAM, and provides an instruction and a data for the processor 810. A part of the memory 820 may further include a nonvolatile RAM. For example, the memory 820 may further store information about a device type.

The bus system 830 may further include a power bus, a control bus, a status signal bus, and the like, in addition to a data bus. However, for clarity of description, various buses are marked as the bus system 830 in the figure.

In an implementation process, the steps in the foregoing methods may be completed using an integrated logic circuit of hardware in the processor 810 or an instruction in a form of software. Steps of the methods disclosed with reference to the embodiments of the present invention may be directly executed and accomplished by means of a hardware processor or may be executed and accomplished using a combination of hardware and software modules in the processor. The software module may be located in a mature storage medium in the art, such as a RAM, a flash memory, a ROM, a PROM, an EEPROM or a register. The storage medium is located in the memory 820. The processor 810 reads information from the memory 820 and completes the steps of the foregoing methods in combination with the hardware of the processor 810. To avoid repetition, details are not described herein again.

It should be understood that the user equipment 500 and the user equipment 800 according to the embodiments of the present invention may correspond to the user equipment in the method for transmitting information in the embodiments of the present invention and that the foregoing and other operations and/or functions of the modules in the user equipment 500 and the user equipment 800 each are used to implement corresponding procedures of the methods in FIG. 1 to FIG. 3, and for brevity, details are not described herein again.

In addition, a computer readable medium is further provided, including a computer readable instruction that performs, upon being executed, the operations of S210 to S230 in the method in the foregoing embodiment.

In addition, a computer program product is further provided, including the foregoing computer readable medium.

Therefore, according to the user equipment provided in this embodiment of the present invention, scheduling assignment signaling that carries a timing advance sent by a user equipment can bear more useful information, thereby avoiding unnecessary waste.

Figure 6:
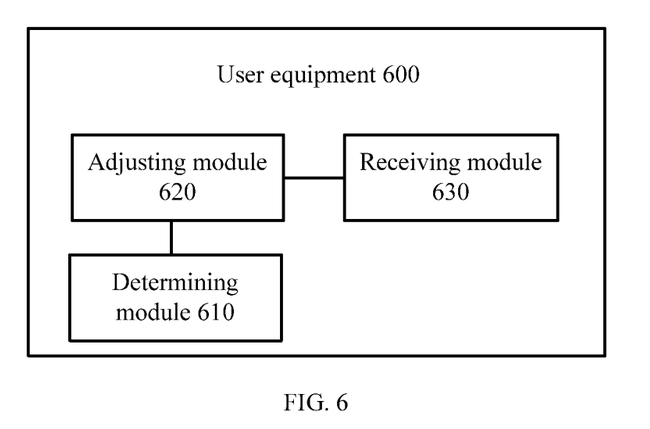
FIG. 6 shows a schematic block diagram of another user equipment according to an embodiment of the present invention.

FIG. 6 shows a schematic block diagram of another user equipment 600 according to an embodiment of the present invention, where the user equipment 600 includes a determining module 610 configured to determine a timing adjustment of a signal; an adjusting module 620 configured to adjust a time window according to the timing adjustment determined by the determining module 610; and a receiving module 630 configured to receive the signal using a time window adjusted by the adjusting module 620.

Optionally, the timing adjustment is determined, after an indication N of the timing adjustment is determined, by the determining module 610 according to at least the N.

Optionally, the timing adjustment is determined by the determining module 610 according to the N and T=N*D, where a value of D is any one of: 1 Ts, 2 Ts, 4 Ts, 8 Ts, 16 Ts, 24 Ts or 32 Ts; and 1 Ts=1 ms/30720 and ms represents millisecond. Herein, N*D indicates that N is multiplied by D.

Optionally, the indication N of the timing adjustment is acquired by the determining module 610 using received scheduling assignment signaling.

Optionally, the indication N of the timing adjustment is obtained after the determining module 610 acquires an indication M of the timing adjustment using SIB signaling sent by a base station and determines that the indication M of the timing adjustment is the indication N of the timing adjustment.

The determining module 610 includes a first determining unit configured to acquire the indication N of the timing adjustment using the received scheduling assignment signaling and determine a first timing adjustment $T_1$ according to the N and $T_1$=N*D, where a value of D is any one of: 1 Ts, 2 Ts, 4 Ts, 8 Ts, 16 Ts, 24 Ts or 32 Ts; and 1 Ts=1 ms/30720 and ms represents millisecond; a second determining unit configured to acquire the indication M of the timing adjustment using the SIB signaling sent by the base station and determine a second timing adjustment $T_2$ according to the M and $T_2$=M*D, where the value of D is any one of: 1 Ts, 2 Ts, 4 Ts, 8 Ts, 16 Ts, 24 Ts or 32 Ts; and 1 Ts=1 ms/30720 and ms represents millisecond; and a third determining unit configured to determine that $T_2$ is the timing adjustment of the signal if $(T_2-T_1) \leq T\_cp*Alpha$, where T_cp is a length of a system cyclic prefix and a value of Alpha is 0.2, 0.4, 0.6, 0.8 or 1; or determine that $T_1$ is the timing adjustment of the signal if $(T_2-T_1) > T\_cp*Alpha$, where T_cp is a length of a system cyclic prefix and a value of Alpha is 0.2, 0.4, 0.6, 0.8 or 1.

Figure 9:
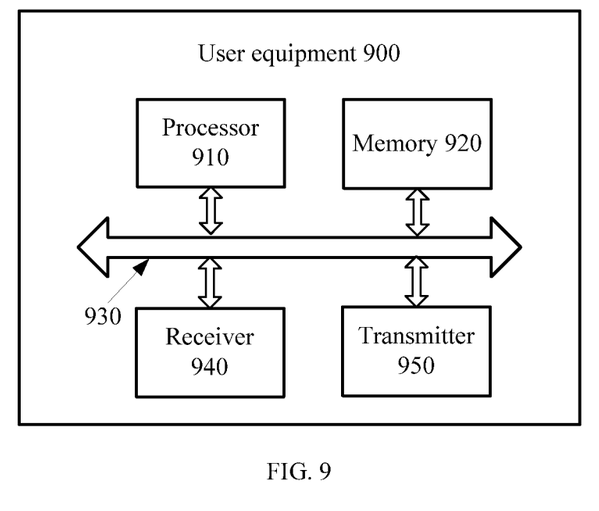
FIG. 9 shows a schematic block diagram of another user equipment according to an embodiment of the present invention.

As shown in FIG. 9, an embodiment of the present invention further provides another user equipment 900, where the user equipment 900 includes a processor 910, a memory 920, a bus system 930, a receiver 940 and a transmitter 950. The processor 910, the memory 920, the receiver 940 and the transmitter 950 are connected by the bus system 930. The memory 920 is configured to store an instruction, and the processor 910 is configured to execute the instruction stored in the memory 920 so as to control the receiver 940 to receive a signal, signaling, or a message and control the transmitter 950 to send a signal, signaling, or a message. The processor 910 is configured to determine a timing adjustment of a signal and adjust a time window according to the timing adjustment, and the receiver 940 is configured to receive the signal using an adjusted time window.

Optionally, the timing adjustment is determined, after an indication N of the timing adjustment is determined, by the processor 910 according to at least the N.

Optionally, the timing adjustment is determined by the processor 910 according to the N and T=N*D, where a value of D is any one of: 1 Ts, 2 Ts, 4 Ts, 8 Ts, 16 Ts, 24 Ts or 32 Ts; and 1 Ts=1 ms/30720 and ms represents millisecond. Herein, N*D indicates that N is multiplied by D.

Optionally, the indication N of the timing adjustment is acquired by the processor 910 using scheduling assignment signaling received by the receiver 940.

Optionally, the indication N of the timing adjustment is obtained after the processor 910 acquires an indication M of the timing adjustment using SIB signaling sent by a base station and determines that the indication M of the timing adjustment is the indication N of the timing adjustment.

The processor 910 is further configured to acquire the indication N of the timing adjustment using the scheduling assignment signaling received by the receiver 940 and determine a first timing adjustment $T_1$ according to the N and $T_1$=N*D, where a value of D is any one of: 1 Ts, 2 Ts, 4 Ts, 8 Ts, 16 Ts, 24 Ts or 32 Ts; and 1 Ts=1 ms/30720 and ms represents millisecond; acquire the indication M of the timing adjustment using the SIB signaling sent by the base station, and determine a second timing adjustment $T_2$ according to the M and $T_2$=M*D, where the value of D is any one of: 1 Ts, 2 Ts, 4 Ts, 8 Ts, 16 Ts, 24 Ts or 32 Ts; and 1 Ts=1 ms/30720 and ms represents millisecond; and determine that $T_2$ is the timing adjustment of the signal if $(T_2-T_1) \leq T\_cp*Alpha$, where T_cp is a length of a system cyclic prefix and a value of Alpha is 0.2, 0.4, 0.6, 0.8 or 1; or determine that $T_1$ is the timing adjustment of the signal if $(T_2-T_1) > T\_cp*Alpha$, where T_cp is a length of a system cyclic prefix and a value of Alpha is 0.2, 0.4, 0.6, 0.8 or 1.

It should be understood that, in this embodiment of the present invention, the processor 910 may be a CPU, and the processor 910 may also be another general purpose processor, a DSP, an ASIC, an FPGA or another programmable logical device, a discrete gate or transistor logic device, a discrete hardware assembly, or the like. The general purpose processor may be a microprocessor, or the processor may be any conventional processor or the like.

The memory 920 may include a ROM and a RAM and provides an instruction and data for the processor 910. A part of the memory 920 may further include a nonvolatile RAM. For example, the memory 920 may further store information about a device type.

The bus system 930 may further include a power bus, a control bus, a status signal bus, and the like, in addition to a data bus. However, for clarity of description, various buses are marked as the bus system 930 in the figure.

In an implementation process, the steps in the foregoing methods may be completed using an integrated logic circuit of hardware in the processor 910 or an instruction in a form of software. Steps of the methods disclosed with reference to the embodiments of the present invention may be directly executed and accomplished by means of a hardware processor or may be executed and accomplished using a combination of hardware and software modules in the processor. The software module may be located in a mature storage medium in the art, such as a RAM, a flash memory, a ROM, a PROM, an EEPROM or a register. The storage medium is located in the memory 920. The processor 910 reads information from the memory 920 and completes the steps of the foregoing methods in combination with the hardware of the processor 910. To avoid repetition, details are not described herein again.

It should be understood that the user equipment 600 and the user equipment 900 according to the embodiments of the present invention may correspond to the user equipment in the methods for transmitting information in the embodiments of the present invention and that the foregoing and other operations and/or functions of the modules in the user equipment 600 and the user equipment 900 each are used to implement corresponding procedures of the methods in FIG. 1 to FIG. 3, and for brevity, details are not described herein again.

In addition, a computer readable medium is further provided, including a computer readable instruction that performs, when being executed, the operations of S310 to S330 in the method in the foregoing embodiment.

In addition, a computer program product is further provided, including the foregoing computer readable medium.

Therefore, according to the user equipment provided in this embodiment of the present invention, scheduling assignment signaling that carries a timing advance sent by a user equipment can bear more useful information, thereby avoiding unnecessary waste.

It should be noted that the information mentioned herein includes but is not limited to an indication, a signal, signaling, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a ROM, a RAM, a magnetic disk, or an optical disc.

The foregoing descriptions are merely implementation manners of the present invention but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

An embodiment of the present invention provides a method for transmitting information, comprising determining, by a base station, an indication of a timing adjustment; and transmitting, by the base station, the indication to a user equipment.

In a first development of the method for transmitting information according to the embodiment, transmitting, by the base station, the indication to a user equipment comprises transmitting, by the base station, the indication using SIB signaling.

An embodiment of the present invention provides a base station comprising a determining module configured to determine an indication of a timing adjustment; and a transmission module configured to transmit the indication to a user equipment.

In a first development of the base station according to the embodiment, the transmission module transmits the indication using SIB signaling.

What is claimed is:

1. A method for transmitting information, comprising:
   receiving, by a first user equipment (UE), timing adjustment signaling from a base station (BS);
   determining, by the first UE, a timing advance of a signal according to the timing adjustment signaling;
   determining, by the first UE, a timing adjustment indication according to at least $N=f(T/D)$, wherein N represents the timing adjustment indication, wherein f ( ) represents rounding up or rounding down, wherein T represents the timing advance, wherein a value of D is 2 Ts, 4 Ts, 8 Ts, 16 Ts, 24 Ts or 32 Ts, and wherein 1 Ts=1/30720 milliseconds (ms); and sending, by the first UE, scheduling assignment signaling that carries the timing adjustment indication to a second UE.

2. The method according to claim 1, further comprising sending, by the first UE, the signal using the timing advance.

3. A method for transmitting information, comprising:

receiving, by a first user equipment (UE), first signaling that carries a first timing adjustment indication;

determining, by the first UE, a first timing advance of a signal according to at least $T_1=N*D$, wherein $T_1$ represents the first timing advance, wherein N represents the first timing adjustment indication, wherein a value of D is 2 Ts, 4 Ts, 8 Ts, 16 Ts, 24 Ts or 32 Ts, and wherein 1 Ts=1/30720 milliseconds (ms);

adjusting, by the first UE, a time window using the first timing advance; and receiving, by the first UE, the signal using the adjusted time window.

4. The method according to claim 3, wherein the first signaling comprises scheduling assignment signaling from a second UE, and wherein the method further comprises:

receiving, by the first UE, system information block signaling that carries a second timing adjustment indication from a base station (BS); and determining, by the first UE, a second timing advance of the signal according to at least $T_2=M*D$, wherein $T_2$ represents the second timing advance, wherein M represents the second timing adjustment indication, wherein a value of D is 2 Ts, 4 Ts, 8 Ts, 16 Ts, 24 Ts or 32 Ts, and wherein 1 Ts=1/30720 milliseconds (ms).

5. The method according to claim 4, wherein adjusting, by the first UE, the time window using the first timing advance comprises adjusting, by the first UE, the time window using the first timing advance when $(T_2-T_1) \leq T\_cp*Alpha$, wherein T_cp is a length of a system cyclic prefix and wherein a value of Alpha is one of 0.2, 0.4, 0.6, 0.8 and 1.

6. The method according to claim 3, wherein the first signaling comprises scheduling assignment signaling from a second UE, or system information block signaling from a BS.

7. A user equipment (UE), comprising:

a receiver configured to receive timing adjustment signaling from a base station (BS);

a processor coupled to the receiver and configured to:

determine a timing advance of a signal according to the timing adjustment signaling;

determine a timing adjustment indication according to at least N=f (T/D), wherein N represents the timing adjustment indication, wherein f ( ) represents rounding up or rounding down, wherein T represents the timing advance, wherein a value of D is 2 Ts, 4 Ts, 8 Ts, 16 Ts, 24 Ts or 32 Ts, and wherein 1 Ts=1/30720 milliseconds (ms); and a transmitter coupled to the processor and configured to send scheduling assignment signaling that carries the timing adjustment indication to another UE.

8. The user equipment according to claim 7, wherein the transmitter is further configured to send the signal using the timing advance.

9. A user equipment (UE), comprising:

a receiver configured to receive first signaling that carries a first timing adjustment indication;

a processor coupled to the receiver and configured to:

determine a first timing advance of a signal according to at least $T_1=N*D$, wherein $T_1$ represents the first timing advance, wherein N represents the first timing adjustment indication, wherein a value of D is 2 Ts, 4 Ts, 8 Ts, 16 Ts, 24 Ts or 32 Ts, and wherein 1 Ts=1/30720 milliseconds (ms); and adjust a time window using the first timing advance; and a receiver coupled to the processor and configured to receive the signal using the time window.

10. The user equipment according to claim 9, wherein the first signaling comprises scheduling assignment signaling from a second UE, wherein the receiver is further configured to receive system information block signaling that carries a second timing adjustment indication from a base station (BS) and the processor is further configured to determine a second timing advance of the signal according to at least $T_2=M*D$, wherein $T_2$ represents the second timing advance, wherein M represents the second timing adjustment indication, wherein a value of D is 2 Ts, 4 Ts, 8 Ts, 16 Ts, 24 Ts or 32 Ts, and wherein 1 Ts=1/30720 milliseconds (ms).

11. The user equipment according to claim 10, wherein the processor is further configured to adjust the time window using the first timing advance when $(T_2-T_1) \leq T\_cp*Alpha$, wherein T_cp is a length of a system cyclic prefix, and wherein a value of Alpha is one of 0.2, 0.4, 0.6, 0.8 and 1.

12. The user equipment according to claim 9, wherein the first signaling comprises scheduling assignment signaling from a second UE, or system information block signaling from a BS.

* * * * *